Sept. 8, 1925.

H. NYQUIST

MEANS FOR MEASURING TELEGRAPH DISTORTION

Filed April 2, 1923  2 Sheets-Sheet 1

INVENTOR
H. Nyquist
BY
ATTORNEY

Sept. 8, 1925.

H. NYQUIST

MEANS FOR MEASURING TELEGRAPH DISTORTION

Filed April 2, 1923 2 Sheets-Sheet 2

INVENTOR
*H. Nyquist*
BY
*[signature]*
ATTORNEY

Patented Sept. 8, 1925.

1,552,499

UNITED STATES PATENT OFFICE.

HARRY NYQUIST, OF ELMHURST, NEW YORK, ASSIGNOR TO AMERICAN TELEPHONE AND TELEGRAPH COMPANY, A CORPORATION OF NEW YORK.

MEANS FOR MEASURING TELEGRAPH DISTORTION.

Application filed April 2, 1923. Serial No. 629,497.

*To all whom it may concern:*

Be it known that I, HARRY NYQUIST, residing at Elmhurst, in the county of Queens and State of New York, have invented certain Improvements in Means for Measuring Telegraph Distortion, of which the following is a specification.

This invention relates to electrical measuring systems and particularly to means for measuring the magnitude of distortion of telegraph signals produced in the course of their transmission over line circuits. This invention is specially directed to the quantitative determination of that form of distortion which manifests itself in the lengthening or shortening of the period of duration of the transmitted signal.

In the transmission of telegraph signals over a transmission line, various kinds of distortion of the transmitted signal may be produced thereby. One kind of distortion consists in changing the shape of the transmitted wave as, for example, the rounding off of the corners of a square-topped transmitted wave. My invention is not concerned with this form of distortion but it relates to the measurement of the variation in the length of received signals from the length of the signals when transmitted, which variation may be caused by transmission over a line circuit.

Heretofore, the amount of distortion has sometimes been determined by ear, a good operator being able to detect the difference between good signals and those designated as unsteady or biased. Another means for determining the magnitude of distortion is the Wheatstone receiver. By means of this device, which has been employed to a great extent and is satisfactory when moderate accuracy only is desired, the length of a dot made on a tape moving with uniform velocity is measured and compared with the length of an undistorted dot. There are, however, certain disadvantages in using this device, especially in making routine tests.

It is the object of this invention to provide fairly simple means for quantitatively determining the lengthening or shortening of the received telegraph signals, which may be employed in making routine measurements under conditions where the circuit is not looped back, that is, where the transmitting and receiving terminals are in different offices. But it is equally well adapted to make measurements on looped circuits.

Figure 1:
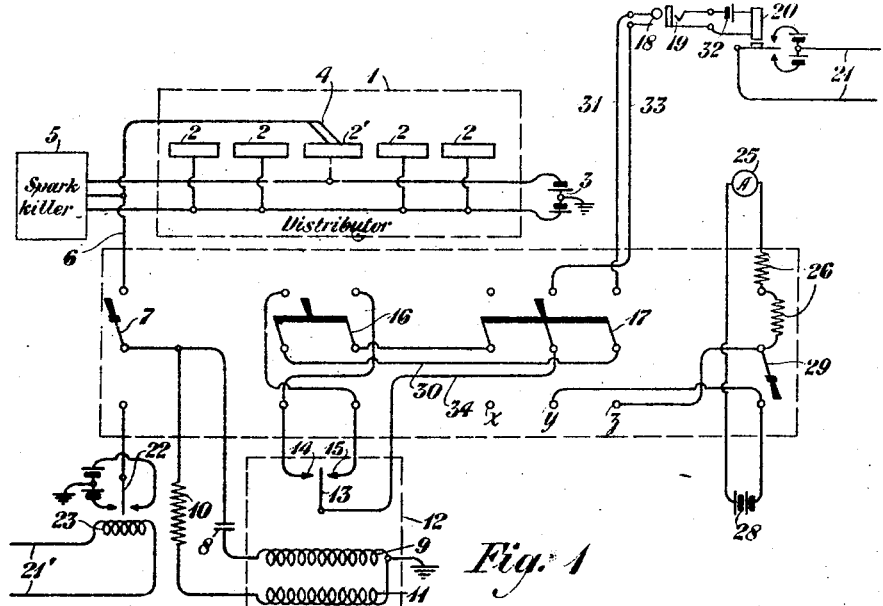
Figure 2:
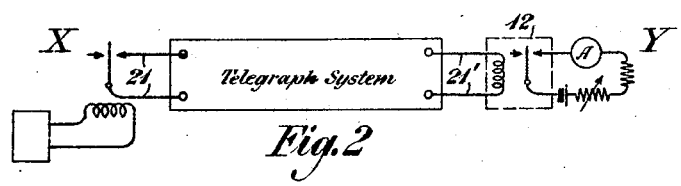

Other and further objects of this invention will be apparent from the following description when read in connection with the attached drawing, of which Figure 1 shows in detail certain terminal apparatus adapted to perform two functions, viz, the transmission of a predetermined signal, the reception of said signals and measurement of the magnitude of the distortion; Fig. 2 shows the schematic arrangement of a telegraph system shown in detail in Fig. 1; Figs. 3 to 9 inclusive represent various measuring networks forming part of the apparatus shown in Fig. 1 when the said apparatus is arranged for the reception of signals; Fig. 10 represents two signals, each of which is made up of a positive impulse and four negative impulses representing respectively a dot and a space, the space being four times the length of the dot; and Figs. 11 to 13 inclusive show the mode of connecting the circuits of Figs. 3 to 9 inclusive with the switching arrangement of Fig. 1.

The arrangement shown in detail in Fig. 1 and schematically in Fig. 2 is designed for the quantitative measurement of what is commonly referred to as systematic distortion, which may be made up of either symmetric distortion or asymmetric distortion, or both. Since symmetric distortion is a function of the circuit constants mainly, it is independent of the polarity of the marking or spacing signal impulses. A symmetric distortion, which is due mainly to bias in the relays and to inequalities of battery potentials, is reversed in sign when the polarity of the marking and spacing signals are interchanged. It is the object of my invention to measure not only the systematic distortion of telegraph signals but also to separate this distortion into its symmetric and asymmetric components, and to determine the magnitudes of each thereof.

In Fig. 1, the apparatus within the dotted line 1 represents a rotary distributor having a plurality of segments 2, which in the drawing are shown connected with the positive terminal of the battery 3 and another segment, designated 2', connected with the negative terminal of the said battery. Connected with the battery 3 and also with the brush 4, which coacts with the segments 2 and 2', is a spark-killer 5, the function of which, as indicated by its name, is to reduce to a minimum the sparking that tends to occur during the relative rotation of the brush and the segments. Since this device 5 forms per se no part of the invention, it is unnecessary to describe it in detail. Any well known combination of resistance and condenser elements may be used to perform the function of spark reduction. The brush 4 is connected by the conductor 6 with the upper terminal of the single pole-switch 7. The middle terminal of switch 7, which is adapted to be connected with either its upper or its lower terminal, is connected by parallel paths to ground, one of the said paths containing a condenser 8 and a winding 9 and the other a resistance 10 and a winding 11, the said windings forming part of a polar relay 12. This relay has an armature 13, which is adapted to move between the contacts 14 and 15, the said contacts being connected with individual lower terminals of the switch 16. These lower terminals are connected in criss-cross fashion with oppositely disposed upper terminals of the same switch in order to provide means for reversing the conductors of the circuit connected with the said switch. The middle terminals of the switch 16 are connected with the outer blades of the three-pole switch 17 and the armature 13 of relay 12 is connected with the inner blade of said switch. Two of the upper contacts of switch 17 are connected with the contacts of a plug 18, which is adapted for insertion in the jack 19, with which is connected a transmitting relay 20, by means of which impulses of predetermined polarity may be impressed across the line 21 of the telegraph system by and in accordance with the operation of the relay 12 when the switches 7 and 17 are in their upper positions.

Figure 3:
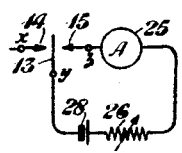

Connected with the lower terminal of switch 7 is the armature 22 of a receiving relay or repeating sounder, which is controlled by the winding 23 of the line 21'. Connected with two of the lower terminals designated $y$ and $z$ of switch 17 is a measuring network such as shown in Fig. 3, comprising an ammeter 25, a resistance 26 (shown in two parts) and a battery or other source of direct current 28. Also connected with the measuring network shown in Fig. 1 is a switch 29, which, when closed in its upper position, varies the constants of the measuring network by shunting part of resistance 26. The third terminal $x$ of the switch 17 is not employed in the circuits of Figs. 1 and 3 but is used in connecting the measuring circuits of Figs. 4 to 9 inclusive, 12 and 13, with the switching circuit of Fig. 1. The mode of connecting these circuits will be explained in the discussion of the circuits of the said figures.

In order to measure distortion by means of the apparatus shown in Fig. 1, one of the sets embodying the said apparatus is connected with one end X of a telegraph system, as shown in Fig. 2, and another set embodying the same apparatus is connected with the end Y of the same system. In the set connected at the end X of the said system, switches 7 and 17 would be thrown to their upper positions and switch 16 would be moved during the course of operations from one position to another in order to determine the components of systematic distortion. The set connected at the end Y of the system would have switches 7 and 17 thrown into their lower positions, and the switch 16 would be varied in position during the course of testing.

Having in mind the foregoing description of the details of the apparatus shown in Figs. 1 and 2, the invention will be clear from the following description of the method of measuring the distortion of telegraph signals. Let it be assumed that the rotary distributor 1 is transmitting impulses of the proper polarity to the relay 12. Thus, for the position of the brush shown in the drawing a negative impulse representing a dot would be transmitted over the conductor 6 and the switch 7 to the windings 9 and 11 of the relay 12. This would cause the movement of the armature 13 to one of the contacts of the relay 12, which, for the purpose of description, will be assumed to be that designated 14. Assuming that the blades of switch 16 are in their lower positions, a circuit would be established from contact 14, over conductors 30 and 31, sleeve contacts of plug 18 and jack 19, winding of relay 20 to the source of potential 32, thence over the tip contacts of jack 19 and plug 18, conductors 33 and 34 to the armature 13 of the relay 12. This would cause the movement of the armature of the transmitting relay 20 to that contact from which a negative impulse would be transmitted over the conductors 21 to the distant end of the telegraph system, shown in Fig. 2. At the distant end Y, the conductors 21' would be connected with the winding 23 of a receiving relay or repeating sounder, which forms part of the set shown in Fig. 1. The armature 22 of this relay will be moved in accordance with the receipt of negative impulses over the said line and will touch one of its contacts as, for example, that connected with the negative battery. It will be remembered that the switches 7 and 17 of the apparatus of Fig. 1 are in their downward position when the apparatus is used at the receiving end of the telegraph circuit. Accordingly, the negative impulse from the battery connected with the contacts of the receiving relay will flow over the armature 22 through the blade of switch 7, then over the parallel paths containing the windings 9 and 11 of relay 12 to ground. This will cause the operation of the armature 13 of the said relay and will cause it to touch one of its contacts as, for example, that designated 14. Since switch 17 is in its lower position current will flow from battery 28 through the meter 25, resistance 26, the right-hand blade of switch 17, conductor 30, lower contact of switch 16 (assuming that switch 16 is in its lower position), contact 14, armature 13, conductor 34, middle blade of switch 17 to battery 28. This impulse will cause a deflection of the needle associated with the meter 25. The meter 25 is preferably a galvanometer, the period of which is great in comparison with the time intervening between successive impulses of the same polarity transmitted over the line circuit as the result of the operation of distributor 1. By using a device of this character, the needle, once it has been deflected, will tend to remain at a definite point upon the scale of the galvanometer, if the time duration of the received signal remains constant, i. e., no distortion. On the other hand, an increase or decrease in the length of the period of the received signal will produce a corresponding deviation of the needle of the galvanometer from the position to which it was moved by the receipt of an undistorted signal.

Figs. 3 to 9 inclusive show schematically various forms of measuring networks which are adapted to be used with the apparatus shown in Fig. 1 in substitution for the measuring network therein represented. In these figures, the same designating symbols have been used to represent parts similar to those shown in Fig. 1. The arrangement shown in Fig. 3, which is substantially the measuring network of Fig. 1, is simple in its structure but is not capable of such accurate measurement as the other network shown for the reason that the circuit through the meter 25 is open during the interval in which the armature 13 is moving from one contact to the other; and unless the switch 16 is operated in opposite direction the measuring circuit of Figs. 1 or 3 will be open except when dot impulses are being received. With switch 16 in lower position dot impulses are impressed on the measuring circuit and in its upper position space impulses are so impressed. Since the arrangement shown in Fig. 3 is simple in its structure, it will best suffice to use it in describing the operation of the circuit embodying this invention.

Let it be assumed that the rotary distributor 1 is operating so as to transmit a dot and a space, the dot constituting 1/5 of the total length of the transmitted signal and the space constituting 4/5 thereof. The transmission of this signal will operate the relay 12, which in turn will transmit the signal to the line 21 by the operation of the relay 20. The relay 23 at the distant end of the line operates the relay 12 of the set located there. The operation of this relay will close the measuring circuit during the reception of the dot and will open the circuit during the reception of the space. Thus, if we assume that switch 16 is in its downward position and the armature 13 touches the contact 14 during the reception of the dot signal, a circuit is established from the positive terminal of battery 28, through the meter 25, resistance 26, right-hand outer blade of switch 17, conductor 30, contact 14, armature 13, conductor 34, middle blade of switch 17 to the negative terminal of battery 28. The needle of the galvanometer 25 will take a definite position, depending upon the magnitude of the current flowing therethrough, and the duration of the signal. When the dot signal ceases and the spacing signal begins, the armature 13 moves and touches contact 15. The circuit through the meter 25 will be open during the period of time in which the spacing signal is being received, because contact 15 is connected with the terminal $x$ of switch 17, which is not connected with the meter 25. Since the period of the meter 25 is great relative to the periodicity of recurrence of the dot signals, the needle will tend to remain at a definite position upon the scale, depending upon the length of the received impulse, which position for an undistorted impulse would be known. If, however, due to constants of the transmission circuit, the length of the received impulse is greater or less than the transmitted impulse, the needle of the meter 25 will move upward or downward upon the scale, and the reading of the meter will be directly proportional to the length of the signal. This will be apparent when it is realized that if the dot signal comes through undistorted, the measuring circuit will be closed for 1/5 of the total time and the average deflection of the meter will be equal to the deflection in a circuit having five times the resistance and closed continuously. The magnitude of distortion may be obtained from the ratio of the reading of the meter for the distorted signal to that for the undistorted signal. Or, it might be simpler to adjust the resistance 26 in series with the meter until the same reading is obtained for undistorted and distorted signals, and the magnitude of distortion could be determined from the setting of the calibrated resistance 26. If the switch 16 is moved to its upper position, the conductors connecting the relay 12 with the measuring circuit are reversed so that spacing impulses which are of opposite polarity to the dot impulses, will be impressed on the measuring circuit. If the needle of the meter 25 indicates the same distortion regardless of the position of the switch 16, it indicates that the distortion is created solely by the circuit constants and is of that class known as symmetric distortion. On the other hand, if the reading of the meter 25 is different when the switch 16 is in its upper position, than when in its lower position, the distortion is due mainly to bias in the relays or to inequality of battery potential and is of that type known as asymmetric distortion.

As was stated above, the circuit of Fig. 3 does not give as accurate results as the measuring circuits shown in the other figures. The arrangement shown in Fig. 4 possesses an advantage over that shown in Fig. 3 in that current flows through the meter while the armature is passing from one contact to the other, by virtue of the resistance 35 shunting one contact of the relay. By properly proportioning this resistance, the current through the meter can be made approximately ½ that produced by the receipt of an undistorted signal. A similar shunting resistance 35 is shown in each of the Figures 4 to 9 inclusive.

In order to adjust for variations in voltage of the measuring network, a variable resistance 26 is inserted in series with the battery. To make this adjustment equivalent to a change in voltage, the impedance of the circuit should be independent of the position of the armature. By means of the arrangements shown in Figs. 5, 6 and 8, it is unnecessary to keep the impedance independent of the armature position. The two parallel resistances represented at 26 and 36 are varied simultaneously so that their resultant resistance is constant.

Figure 4:
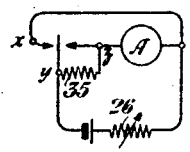
Figure 5:
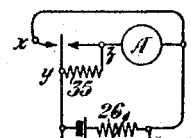

In using the measuring networks shown in Figs. 3, 4 and 5, it is, of course, necessary to determine the position of the needle of the meter for undistorted signals, that is, for impulses having the same duration as the transmitted impulses. Knowing the position of the needle for undistorted signals, the magnitude of positive or negative distortion may be readily determined from the variation in position of the needle for undistorted signals.

Figure 6:
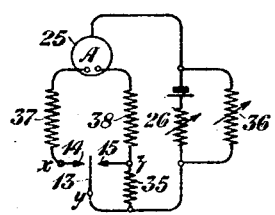
Figure 7:
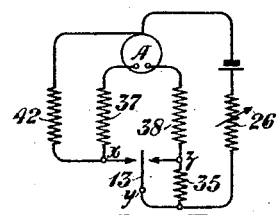
Figure 8:
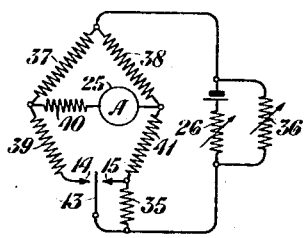
Figure 9:
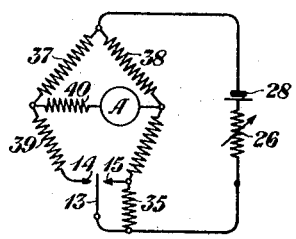
Figure 10:
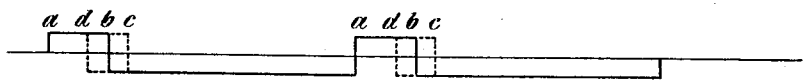

The arrangements shown in Figs. 6 to 9 inclusive are such that the reading of the meter is zero for zero distortion and indicates directly in proportion to the distortion. Thus, the meter can be made direct reading. In Figs. 6 and 7 a differential ammeter is employed while in Figs. 8 and 9 a type of unbalanced Wheatstone bridge is used. In the circuits of Figs. 7 and 9, the impedance of the circuit is independent of whether the armature is on its left or its right-hand contact, but it is considerably increased during the time the armature is in the air. In the circuits of Figs. 6 to 9 inclusive the measuring circuit per se is shown connected with the contacts and armature of relay 12 but the switches have been omitted. The connections shown are those resulting when switch 16 is in its upper position and switch 17 in its lower position. Contacts 14 and 15 are then connected with terminals $x$ and $z$ of switch 17 and armature 13 with terminal $y$.

Of the two forms of Wheatstone bridge networks represented Fig. 9 is the more desirable. This arrangement comprises two ratio arms 37 and 38, the junction point of which is connected with one terminal of the battery 28. These ratio arms are preferably resistances, as is also the third arm 39 of the bridge. The fourth arm of the bridge has substantially no resistance. Bridged across the outer terminals of the ratio arms 37 and 38 is a meter 25, in series with the resistance 40. The third and fourth arms of the bridge are connected respectively with the contacts 14 and 15 of the relay 12, the armature 13 of which is connected with the junction of the ratio arms, the connection including the battery 28 and a variable resistance 26. The contact point 15 is connected with the armature conductor by the resistance 35 so as to provide a closed circuit for the meter 25 at all times regardless of the position of the armature. The armature 13 is adapted to move between its contacts and to remain thereon in accordance with the signaling impulses received over the line circuit of the telegraph system. It will be apparent that for the different positions of the armature 13 the current flowing through the network will be different. The resistances, however, are so chosen that for undistorted signaling impulses no difference of potential will exist across the outer terminals of the ratio arms and therefore no current will flow through the meter 25. The needle is adjusted to the zero position upon the scale adapted to indicate positive and negative values, and the scale is calibrated to indicate the degree of distortion of the signaling impulses. In receiving the signal represented by the solid line of Fig. 10, in which the spacing impulse $ba$ has four times the length of the dot impulse $ab$, the resistance of the network of Fig. 9 would be so chosen that the elements thereof connected with the source 28 when a spacing signal is received would be in magnitude equal to ¼ the resistance of the elements connected with the same source when a dot signal is received. Thus, for an undistorted received signal, the quantity of the charge flowing through the network for dot and spacing impulses would be the same and there would be no deviation of the needle from zero. If, however, the impulses were lengthened or shortened as represented by $bc$ or $bd$ the balance of the network would be disturbed and the degree of distortion would be indicated by the new position of the needle.

Figure 11:
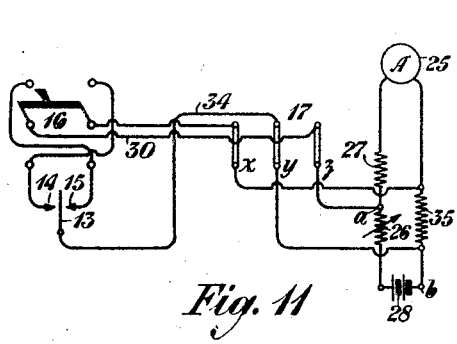
Figure 12:
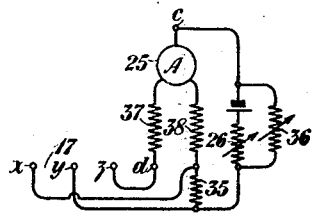
Figure 13:
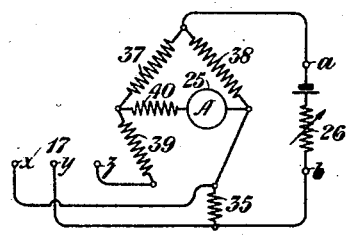

Figs. 11, 12 and 13 show in simple form the mode of connection of certain of the networks with the switches of Fig. 1. The network shown in Fig. 4 may be connected with the circuit of Fig. 1 in substitution for the network therein shown by arranging the connections in the manner shown in Fig. 11. The network shown in Fig. 5 would be similarly connected but would have in addition a variable resistance 36 connected between the points $a$ and $b$ in parallel with the resistance 26 and the battery 28. Fig. 12 shows the method of connecting the network of Fig. 6 with the switching arrangement of Fig. 1. The connection of the network shown in Fig. 7 would be, in general, like that shown in Fig. 12, except that the variable resistance 36 of the latter figure will be omitted and a resistance 42 would be connected between the points $c$ and $d$. Fig. 13 represents the method of connecting the network of Fig. 9 with the switching arrangement of Fig. 1 and the circuit of Fig. 8 would also be connected in the same manner with the terminals of switch 17.

It will be seen that by means of the arrangements shown in the aforedescribed figures, a recurring signal comprising impulses of definite duration and spacing may be applied to a line circuit and the systematic distortion of such signals may readily be determined by means of any of the measuring networks herein disclosed. Furthermore, by means of the switching device the components of the distortion, that is to say, the symmetric and asymmetric elements, may be separately determined.

While this invention has been disclosed in certain forms and arrangements of parts it is to be understood that it is capable of embodiment in other and different forms and arrangements within the spirit and scope of the appended claims.

What is claimed is:

1. In a telegraph signal distortion measuring system, the combination with a line circuit of means for applying thereto a plurality of signaling impulses of equal length and equally spaced apart and a measuring network connected with said line circuit at any point thereof and having means to indicate any variation in length between the received and the transmitted impulses.

2. In a telegraph signal distortion measuring system, the combination with a line circuit of means for applying thereto a plurality of marking signal impulses of equal length and separated by spacing impulses also of equal length, a measuring circuit connected with said line circuit at any point thereof and having means to indicate any variation in length between the received and transmitted impulses, and switching means responsive to said impulses to control the connections of said measuring circuit.

3. In a telegraph signal distortion measuring system, the combination with a line circuit of means for applying thereto a plurality of signaling impulses of equal length and equally spaced apart, a Wheatstone bridge connected therewith so proportioned as to be unbalanced when any variation in length exists between the received and the transmitted signals, and single switching means responsive to said impulses to control the connections of said bridge.

4. In a telegraph signal distortion measuring system, the combination with a line circuit of means for impressing thereon a plurality of identical signaling impulses equally spaced, a network also connected with said line circuit at any point thereof comprising ratio arms, an indicating device across the outer terminals of the said ratio arms, a relay having an armature and front and back contacts, a source of direct current connected between the junction of the ratio arms and the armature of said relay, the contacts of which are connected with the third and fourth arms respectively of the said bridge, and means to control the armature of the said relay by and in accordance with the received signaling impulses.

5. A Wheatstone bridge network for measuring the distortion of telegraph signals comprising ratio arms, a third and a fourth arm connected respectively with the said ratio arms and having an indicating device connected across the junction points thereof, a relay having its contacts connected respectively with the said third and fourth arms, and a source of direct current and a variable resistance connected between the armature of said relay and the junction point of said ratio arms.

6. In a device for measuring the symmetric and asymmetric distortion of signaling circuits the combination with a line circuit of means for impressing thereon impulses of different polarity, and a distortion measuring device connected with said line circuit at any point thereof, the said device comprising a relay controlled by said impulses, a measuring circuit, containing an indicating instrument and a source of current, connected with the contacts of said relay, and switching means inserted in said connection to control application of current to said indicating instrument by and in accordance with the received impulses, whereby the character of the distortion may be determined.

In testimony whereof, I have signed my name to this specification this 30th day of March 1923.

HARRY NYQUIST.